May 10, 1955

W. C. WOLF 2,708,010

CLUTCH OR BRAKE BAND

Filed Aug. 18, 1952

William C. Wolf
INVENTOR.

BY *Clarence A. O'Brien
and Harvey B. Jacobson*
Attorneys

United States Patent Office

2,708,010
Patented May 10, 1955

2,708,010

CLUTCH OR BRAKE BAND

William C. Wolf, Pine Bluff, Ark., assignor of fifty per cent to Charles Wilson Hogan, Pine Bluff, Ark.

Application August 18, 1952, Serial No. 304,907

1 Claim. (Cl. 188—259)

This invention relates to new and useful improvements and structural refinements in bands for clutches and brakes, and the principal object of the invention is to facilitate convenient and expeditious installation and removal of the band, such as for example is necessitated by relining.

The above object is achieved by constructing the band in a pair of complemental sections and providing means for separably connecting those sections together, whereby the two sections may be readily separated to facilitate installation or removal.

Some of the advantages of the invention reside in its simplicity of construction, in its durability, in its dependability and in its adaptability to economical manufacture.

With the above more important objects and features in view, and such other objects and features as may become apparent as this specification proceeds, the invention consists essentially of the arrangement and construction of parts as illustrated in the accompanying drawing, in which.

Like characters of reference are employed to designate like parts in the specification and throughout the several views.

Figure 1:
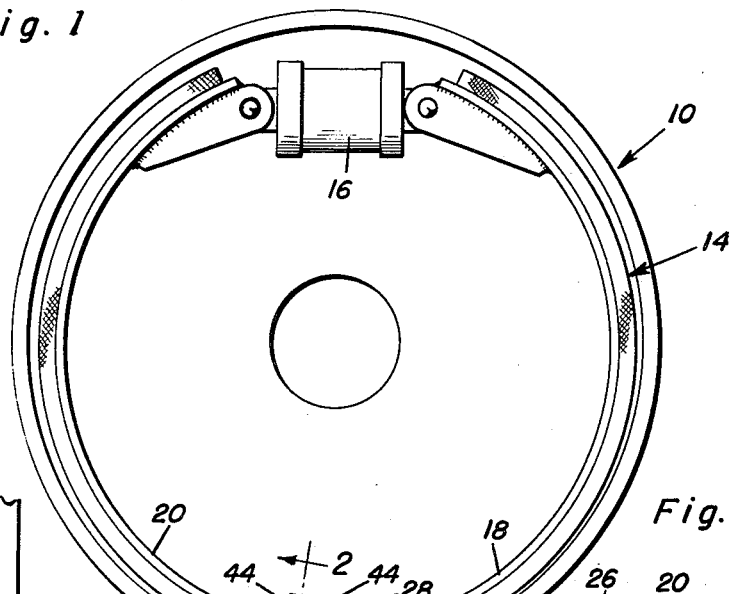
Figure 1 is an elevational view of a clutch or brake band of the internal expanding type, constructed in accordance with this invention.
Figure 2:
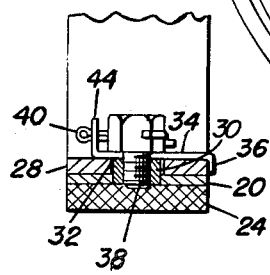
Figure 2 is a fragmentary sectional detail, taken substantially in the plane of the line 2—2 in Figure 1.
Figure 3:
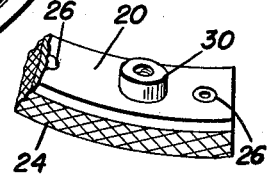
Figure 3 is a fragmentary perspective view showing an end portion of one of the band sections.
Figure 4:
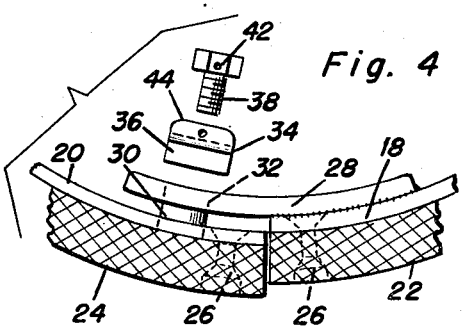
Figure 4 is a group elevational view illustrating the connection between the two band sections; and, Figure 5 is an elevational view of a clutch or brake band of the external contracting type, constructed in accordance with this invention.

Referring now to the accompanying drawing in detail, more particularly to Figures 1-4 inclusive, the general reference character 10 designates a conventional brake support carrying an internal expanding band assembly 14 adapted for actuation by a suitable cylinder 16.

The band assembly 14 comprises first and second complemental band sections 18, 20 which have abutting ends and each of which is provided with lining 22, 24, respectively, secured thereto by suitable rivets 26. The lining 22, 24 is co-extensive with the respective band sections 18, 20.

The separable connection between the band sections may be provided at any point in the length of the entire band, said connection involving the provision of a connecting strip 28 which is secured to an end portion of the first band section 18 and overlaps the end portion of the second band section 20. A substantially circular, internally screw-threaded boss 30 is secured to the second band section 24 and is disposed in a locating aperture 32 in the connecting strip 28. In this manner the two band sections are held in proper alignment, and an apertured plate 34 is superposed on the strip 28 and has an angulated portion 36 which engages a side edge of the strip and thereby prevents the plate 34 from rotating.

A threaded bolt or capscrew 38 extends through the plate 34 and engages the threads of the boss 30, whereby to secure the two band sections together.

The bolt 38 is locked against rotation by a cotter pin 40 passing through a bore 42 in the head of the bolt 38 and also passing through an aperture in an upturned portion 44 of the plate 34.

It will be apparent from the foregoing that by simply removing the cotter pin and the bolt 38, the brake or clutch band sections may be readily separated for convenient removal or installation, as the case may be.

Figure 5:
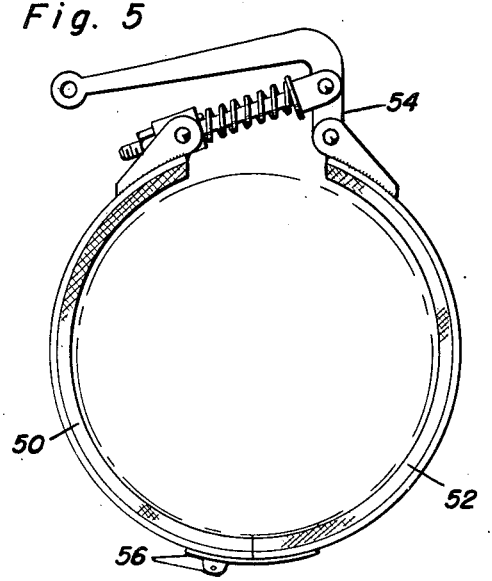

The embodiment of the invention illustrated in Figures 1-4 is that of an internal expanding brake, or clutch, while the embodiment shown in Figure 5 is that of an external contacting brake or clutch, including a pair of complemental band sections 50, 52 actuated by suitable mechanism 54 of any conventional type, and separably connected together by the means 56 which are the same as the means already described for connecting the band sections 18, 20.

It is believed that the advantages and use of the invention will be readily understood from the foregoing disclosure and therefore, further description thereof at this point is deemed unnecessary.

While in the foregoing there has been shown and described the preferred embodiment of this invention it is to be understood that minor changes in the details of construction, combination and arrangement of parts may be resorted to without departing from the spirit and scope of the invention as claimed.

Having described the invention, what is claimed as new is:

A clutch or brake band comprising first and second complemental half sections having abutting ends, a lining secured to each of said sections and coextensive therewith, a relatively shorter connector strip overlapping said abutting ends and integrally secured on the first half section, said strip having an aperture therein overlying the second half section, an annular internally threaded boss on the second half section fitting in said aperture flush with said strip and maintaining said half sections aligned, a plate overlying said strip and having an aperture therein coaxial with said boss and an angulated portion engaging one edge of said strip to prevent said plate from turning, a fastening bolt inserted through the aperture in the plate and turned into said boss in clamping engagement with said plate, and a removable pin in said bolt interlocking with said plate to lock the bolt against turning.

References Cited in the file of this patent

UNITED STATES PATENTS

| Number | Name | Date |
|---|---|---|
| 1,382,305 | Malligan et al. | June 21, 1921 |
| 1,398,191 | Hudson | Nov. 22, 1921 |
| 1,590,395 | Smith | June 29, 1926 |
| 1,736,985 | Sovereign | Nov. 26, 1929 |
| 1,850,563 | Norton | Mar. 22, 1932 |
| 2,131,932 | Blume | Oct. 4, 1938 |

FOREIGN PATENTS

| 269,850 | Great Britain | Oct. 27, 1927 |